T. H. LOVEJOY.
LIFTING JACK.
APPLICATION FILED MAR. 2, 1910.
975,548.
Patented Nov. 15, 1910.
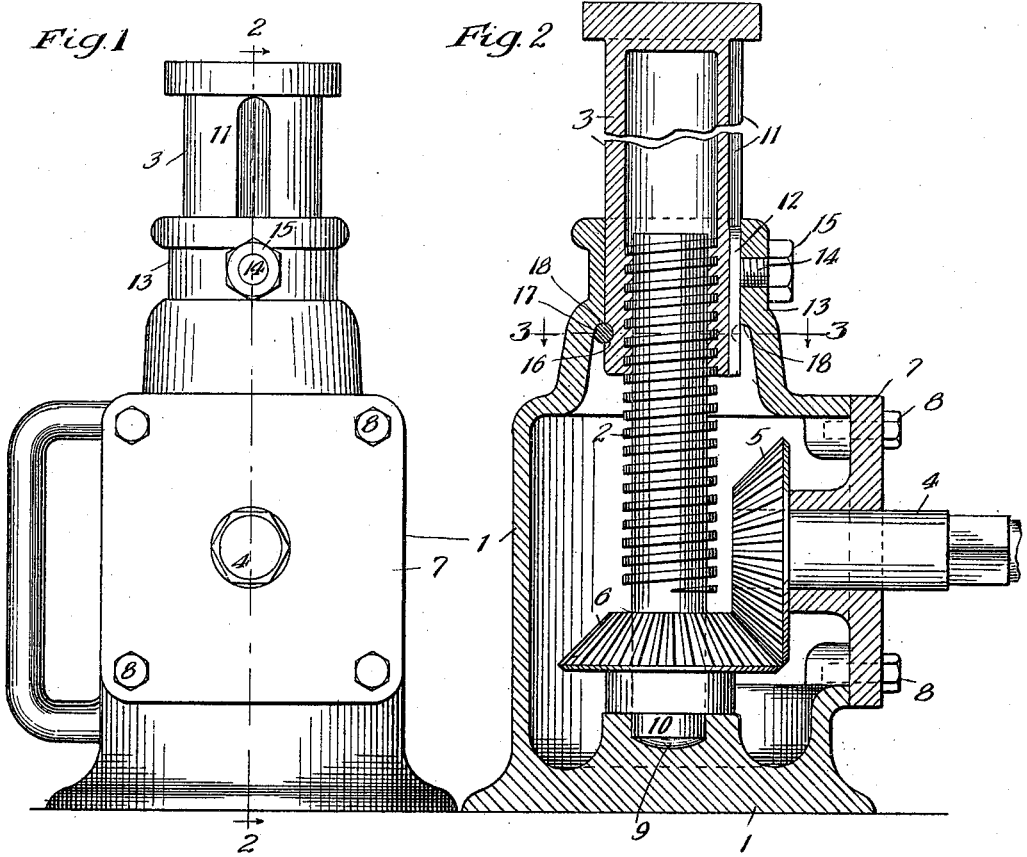
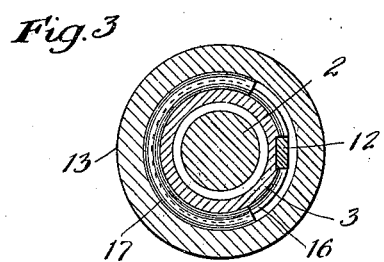
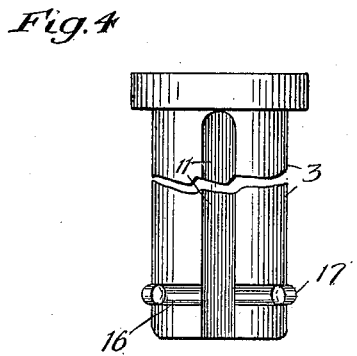
Witnesses:
Wm. Geiger
H. W. Munday
Inventor:
Thomas H. Lovejoy
By Munday, Evarts, Adcock & Clarke,
Attorneys

UNITED STATES PATENT OFFICE.

THOMAS H. LOVEJOY, OF CHICAGO, ILLINOIS.

LIFTING-JACK.

975,548.
Specification of Letters Patent.
Patented Nov. 15, 1910.

Application filed March 2, 1910. Serial No. 546,772.

*To all whom it may concern:*

Be it known that I, THOMAS H. LOVEJOY, a citizen of the United States, residing in Chicago, in the county of Cook and State of Illinois, have invented a new and useful Improvement in Lifting-Jacks, of which the following is a specification.

My invention relates to improvements in lifting jacks for cars and other purposes.

Heretofore in screw jacks for jacking up cars, etc., difficulty is frequently experienced by the workmen running the screw sleeve or standard up too high by the screw, so that the interengaging threads of sleeve and screw are too few to sustain the load without distortion, thus rendering it impossible to further turn the screw in either direction, and causing great inconvenience, delay and trouble.

The object of my invention is to provide an improved construction of screw jack by which the difficulties or inconveniences heretofore experienced may be practically overcome, while at the same time enabling the parts of the jack to be conveniently taken apart when required, and reassembled.

My invention consists in the means I employ to practically accomplish this object or result. That is to say, it consists in connection with the base, lifting screw, screw sleeve or standard of the jack, of a removable segmental stop ring fitting in an external groove on the screw sleeve or standard and adapted to engage a shoulder on the base member, and thus prevent the screw being turned too far and thereby insuring engagement of a sufficient number of the screw threads of the screw and screw sleeve to properly support the load and prevent distortion of the screw threads.

My invention also consists in the novel construction of parts and devices, and in the novel combinations of parts and devices herein shown and described and more particularly specified in the claims.

In the accompanying drawing forming a part of this specification, Figure 1 is a side elevation of a screw jack embodying the invention. Fig. 2 is a vertical section on line 2—2 of Fig. 1. Fig. 3 is a horizontal cross section on line 3—3 of Fig. 2 and Fig. 4 is a detail view of the screw sleeve or standard.

In the drawing, 1 represents the hollow base, 2 the lifting screw, 3 the screw sleeve or standard, 4 the operating shaft and 5, 6 intermeshing bevel gears on the operating shaft and screw respectively.

The base 1 is provided with a removable cap 7 secured in place by screws or bolts 8 and affording a bearing for the operating shaft 4. The base 1 is further provided with a cone bearing 9 for the lower end 10 of the lifting screw 2.

The screw sleeve or standard 3 is provided with a guide groove 11 to receive the spline or guide member 12 which is attached to the base 1 at the upper or neck end 13 thereof by a threaded stud 14, having a nut 15. The screw sleeve or standard 3 is further provided near its lower end with an annular groove or seat 16 to receive a removable segmental or split stop ring 17 and which partially encircles the screw sleeve 3 externally, and is adapted to engage a shoulder 18 on the base 1, and thus limit the extent to which the screw 2 may be turned by the operating shaft 4, and the screw sleeve 3 raised in order to insure that an adequate number of the screw threads of the screw 2 and sleeve 3 are always in engagement with each other to prevent the stripping or distortion of the threads under the heavy loads upon the head of the jack. The removable segmental stop ring 17 is preferably made of a round tempered or spring steel rod.

In order to take the parts of the jack apart or entirely remove the screw sleeve or standard 3 from the base and screw when occasion may require, the screw is first turned until the sleeve 3 is in its lowermost position so as to bring the stop ring 17 opposite the open side of the hollow base 1 which is closed by the cap 7 and then the cap 7 is removed, after which the segmental spring stop ring 17 may be readily sprung out of its annular seat or groove in the sleeve 3, and thus removed, and then the sleeve 3 may be readily entirely unthreaded and removed from the screw 2 and hollow base 1.

I claim:—

1. In a screw lifting jack, the combination with a base, of a lifting screw rotatably mounted on said base, a screw sleeve surrounding said screw and slidably mounted on said base and a removable segmental stop ring surrounding said sleeve and carried thereby to limit the extent of its upward movement, said base having a stop shoulder above said ring for engagement therewith, substantially as specified.

2. In a screw lifting jack, the combination with a base, of a lifting screw rotatably mounted on said base, a screw sleeve surrounding said screw and slidably mounted on said base and a removable segmental stop ring surrounding said sleeve and carried thereby to limit the extent of its upward movement, said screw sleeve having an external annular groove to receive said stop ring, and the base having a shoulder above said ring for engagement with said stop ring, substantially as specified.

3. In a screw lifting jack, the combination with a hollow base having a removable cap, of a lifting screw rotatively mounted on said base, a screw sleeve surrounding said screw and slidably mounted on said base and an operating shaft journaled in said removable cap, said screw sleeve having an annular groove near its lower end, a removable segmental stop ring fitting in said groove on said screw sleeve, said base having a stop shoulder above said ring engaging said stop ring, substantially as specified.

THOMAS H. LOVEJOY.

Witnesses:
H. M. MUNDAY,
PEARL ABRAMS.